United States Patent
Tsukagoshi

(10) Patent No.: US 8,553,070 B2
(45) Date of Patent: Oct. 8, 2013

(54) IMAGE SIGNAL PROCESSING DEVICE, TRANSMITTING DEVICE, IMAGE SIGNAL PROCESSING METHOD, PROGRAM AND IMAGE SIGNAL PROCESSING SYSTEM

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 224 days.

(21) Appl. No.: 12/807,699

(22) Filed: Sep. 10, 2010

(65) Prior Publication Data

US 2011/0063412 A1 Mar. 17, 2011

(30) Foreign Application Priority Data

Sep. 17, 2009 (JP) ................ P2009-215852

(51) Int. Cl.
*H04N 13/00* (2006.01)

(52) U.S. Cl.
USPC ................ 348/42; 348/51; 348/59; 382/118; 353/122

(58) Field of Classification Search
None
See application file for complete search history.

(56) References Cited

U.S. PATENT DOCUMENTS

| | | | |
|---|---|---|---|
| 5,296,919 A * | 3/1994 | Maruno et al. | 348/675 |
| 2006/0204057 A1* | 9/2006 | Steinberg | 382/118 |
| 2007/0035707 A1* | 2/2007 | Margulis | 353/122 |
| 2007/0165304 A1 | 7/2007 | Tomita | |

FOREIGN PATENT DOCUMENTS

| | | |
|---|---|---|
| JP | 2004166160 A | 6/2004 |
| JP | 2006166365 A | 6/2006 |
| JP | 2007-065067 A | 3/2007 |
| JP | 2008258925 A | 10/2008 |
| JP | 2009151016 A | 7/2009 |
| WO | 2008156318 A2 | 12/2008 |

OTHER PUBLICATIONS

Office Action from Japanese Application No. 2009-215852, dated Apr. 9, 2013.
European Search Report from EP Application No. 10176253, dated May 14, 2013.

* cited by examiner

*Primary Examiner* — Sath V Perungavoor
*Assistant Examiner* — Dakshesh Parikh
(74) *Attorney, Agent, or Firm* — Lerner, David, Littenberg, Krumholz & Mentlik, LLP

(57) ABSTRACT

An image signal processing device is provided which includes a receiving unit for receiving an image signal and setting information for each predetermined unit of the image signal including image type setting information to define whether the image signal represents a stereoscopic image and gamma correction setting information to define a gamma correction amount for the image signal, a gamma correcting unit for performing gamma correction for the image signal based on the gamma correction setting information included in the setting information received by the receiving unit, and a stereoscopic image processing unit for selectively performing a process to display the stereoscopic image for the image signal corrected by the gamma correcting unit based on the image type setting information included in the setting information received by the receiving unit.

9 Claims, 12 Drawing Sheets

FIG. 5

```
if( video_signal_type_present_flag ) {
        video_format
        video_full_range_flag
        colour_description_present_flag
        if( colour_description_present_flag ) {
                colour_primaries
                transfer_characteristics
                matrix_coefficients
        }
}
```

FIG. 6

```
Backlight_Control SEI message syntax

Backlight_Control( payloadSize){
  backlight_control_id
  Data_length
  Number_of_Low_Luma_blocks  N
  For (i=0; i<N; i++) {
        MacroBlock_ID
        Averaged_Luma_level
}
```

FIG. 10

```
3D_flag
if( 3D_flag ) {
    Frame_flag
    if (Frame_flag){
        3D_video_format
        switch(3D_video_format){
            Case "0":
                Current_picture_is_L
                3D_pair_Picture
            Case "1":
                Lefthand_side_is_L
            Case "2":
                Top_is_L
            Defaults
        }
    }
}
```

IMAGE SIGNAL PROCESSING DEVICE, TRANSMITTING DEVICE, IMAGE SIGNAL PROCESSING METHOD, PROGRAM AND IMAGE SIGNAL PROCESSING SYSTEM

CROSS-REFERENCE TO RELATED APPLICATION

The present application claims priority from Japanese Patent Application No. JP 2009-215852 filed in the Japanese Patent Office on Sep. 17, 2009, the entire content of which is incorporated herein by reference.

BACKGROUND OF THE INVENTION

1. Field of the Invention

The present invention relates to an image signal processing device, a transmitting device, an image signal processing method, a program and an image signal processing system.

2. Description of the Related Art

In recent years, a display device capable of processing an image signal (right-eye image signal and left-eye image signal) representing a stereoscopic image to display the stereoscopic image on a display screen has been developed. There is a configuration to allow a user to visually recognize the stereoscopic image in cooperation with an external device such as polarization glasses and liquid crystal shutter glasses, a configuration provided with a mechanism related to parallax barrier (configuration without using the external device) and the like, for example, as the configuration to allow the user to recognize the image displayed on the display device as the stereoscopic image.

In these circumstances, technology to realize a high quality image in both of a case in which the stereoscopic image is displayed on the display screen and a case in which a flat image is displayed on the display screen has been developed. For example, the Japanese Patent Application Laid-Open No. 2007-65067 discloses the technology to judge whether it is the stereoscopic image based on the image signal and control a light-emission pattern of a light source provided in the display device based on a judgment result.

BRIEF SUMMARY OF THE INVENTION

When the display device for displaying the stereoscopic image on the display screen is configured to allow the user to visually recognize the stereoscopic image in cooperation with the external device such as the polarization glasses and the liquid crystal shutter glasses, an amount of light entering eyes of the user might decrease according to a type of the external device. For example, when the display device displays the stereoscopic image by a method of alternatively displaying a right-eye image (image represented by the right-eye image signal) and a left-eye image (image represented by the left-eye image signal) in a direction of time and the user watches the image with the liquid crystal shutter glasses, there is a case in which the amount of light entering the eyes of the user through the liquid crystal shutter glasses might decrease. In the above-described case, the image watched by the user becomes dark as a whole due to deficiency of the amount of light, so that eyestrain of the user might occur.

The display device performs light source control and control of brightness gradient, for example, as a method of preventing the amount of light entering the eyes of the user from decreasing. However, when the light source control and the control of the brightness gradient are freely performed on a display device side, a portion in the image, which should be dark, becomes too bright, for example, and intention of a contents (movie and game, for example) author side related to the image displayed on the display screen might not be sufficiently reflected on the image watched by the user. Therefore, in the above-described case, even when it is possible to prevent the amount of light entering the eyes of the user from decreasing when the image signal is displayed on the display screen, there is no certainty that the high quality image (high quality image in a viewpoint that the intention of the contents author side is faithfully reproduced, same in the following) is sufficiently realized.

Herein, the related technology to try to realize the high quality image in both of the case of displaying the stereoscopic image on the display screen and the case of displaying the flat image on the display screen (hereinafter, referred to as the "related technology") controls a light-emission pattern of the light source provided in the display device based on the judgment result of the image type based on the image signal. However, the related technology merely control the light emission-pattern of the light source such that the amount of light entering the eyes of the user is the same when displaying the flat image (2D image) and when displaying the stereoscopic image (3D image). Therefore, there is no certainty that the high quality image is sufficiently realized as in the method of preventing the amount of light entering the eyes of the user from decreasing even when the related technology is used.

In light of the foregoing, it is desirable to provide a novel and improved image signal processing device, transmitting device, image signal processing method, program and image signal processing system capable of realizing the high quality image while preventing the amount of light entering the eyes of the user from decreasing when the image signal is displayed on the display screen.

According to an embodiment of the present invention, there is provided an image signal processing device, including a receiving unit for receiving an image signal and setting information for each predetermined unit of the image signal including image type setting information to define whether the image signal represents a stereoscopic image and gamma correction setting information to define a gamma correction amount for the image signal, a gamma correcting unit for performing gamma correction for the image signal based on the gamma correction setting information included in the setting information received by the receiving unit, and a stereoscopic image processing unit for selectively performing a process to display the stereoscopic image for the image signal corrected by the gamma correcting unit based on the image type setting information included in the setting information received by the receiving unit.

According to such configuration, it becomes possible to process the received image signal and selectively perform the control of the brightness gradient based on the received setting information. Therefore, according to such configuration, it becomes possible to realize the high quality image while preventing the amount of light entering the eyes of the user from decreasing when the image signal is displayed on the display screen.

The gamma correcting unit may selectively perform the gamma correction based on the gamma correction setting information based on process executing information related to execution of a process being stored.

The image signal processing device may further include a display unit for displaying an image corresponding to the image signal output from the stereoscopic image processing unit on a display screen and is capable of adjusting brightness for each part of the display screen, and a brightness controller for transferring a brightness control signal for controlling the brightness of the each part of the display screen to the display unit. The setting information may further include brightness setting information to define the brightness of each part of the display screen, and the brightness controller may transfer the brightness control signal based on the brightness setting information included in the setting information received by the receiving unit to the display unit.

According to an embodiment of the present invention, there is provided a transmitting device, including a setting unit for setting set values to be set in image type setting information to define whether an image signal to be transmitted represents a stereoscopic image, gamma correction setting information to define a gamma correction amount for the image signal to be transmitted and/or brightness setting information to define brightness of each part of a display screen for each predetermined unit of the image signal to be transmitted based on the image signal to be transmitted, a transmission signal generating unit for generating a transmission signal including the image signal to be transmitted and setting information for each predetermined unit of the image signal to be transmitted including the image type setting information, the gamma correction setting information and/or the brightness setting information based on the image signal to be transmitted and the set values for each predetermined unit of the image signal to be transmitted set by the setting unit, and a transmitting unit for transmitting the transmission signal generated by the transmission signal generating unit.

According to such configuration, it becomes possible to generate the setting information for each predetermined unit of the image signal based on the image signal to be transmitted to transmit the image signal and the setting information. Therefore, according to such configuration, it becomes possible to realize the high quality image while preventing the amount of light entering the eyes of the user from decreasing when the image signal is displayed on the display screen.

The setting unit may judge whether the image signal to be transmitted represents the stereoscopic image, and when it is judged that the image signal to be transmitted represents the stereoscopic image, may set the set values based on a brightness average value based on the image signal to be transmitted for each divided area obtained by dividing an area corresponding to a display screen.

The setting unit may derive degree distribution of brightness average values for each divided area and may set the set values based on the derived degree distribution and one or two or more predetermined threshold.

According to an embodiment of the present invention, there is provided an image signal processing method, including the steps of receiving an image signal and setting information for each predetermined unit in the image signal including image type setting information to define whether the image signal represents a stereoscopic image and gamma correction setting information to define a gamma correction amount for the image signal, performing gamma correction for the image signal based on the gamma correction setting information included in the setting information received in the step of receiving, and selectively performing a process to display the stereoscopic image for the image signal corrected in the step of performing the gamma correction based on the image type setting information included in the setting information received in the step of receiving.

By using such method, it becomes possible to realize the high quality image while preventing the amount of light entering the eyes of the user from decreasing when the image signal is displayed on the display screen.

According to an embodiment of the present invention, there is provided a program for causing a computer to execute the steps of receiving an image signal and setting information for each predetermined unit of the image signal including image type setting information to define whether the image signal represents a stereoscopic image and gamma correction setting information to define a gamma correction amount for the image signal, performing gamma correction for the image signal based on the gamma correction setting information included in the setting information received in the step of receiving, and selectively performing a process to display the stereoscopic image for the image signal corrected in the step of performing the gamma correction based on the image type setting information included in the setting information received in the step of receiving.

By using such program, it becomes possible to realize the high quality image while preventing the amount of light entering the eyes of the user from decreasing when the image signal is displayed on the display screen.

According to an embodiment of the present invention, there is provided an image signal processing system, including a transmitting device including a setting unit for setting set values to be set in image type setting information to define whether an image signal to be transmitted represents a stereoscopic image and gamma correction setting information to define a gamma correction amount for the image signal to be transmitted for each predetermined unit of the image signal to be transmitted based on the image signal to be transmitted, a transmission signal generating unit for generating a transmission signal including the image signal to be transmitted and setting information for each predetermined unit of the image signal to be transmitted including the image type setting information and the gamma correction setting information based on the image signal to be transmitted and the set values for each predetermined unit of the image signal to be transmitted set by the setting unit, and a transmitting unit for transmitting the transmission signal generated by the transmission signal generating unit, and an image signal processing device including a receiving unit for receiving the transmission signal, a gamma correcting unit for performing gamma correction for the image signal included in the transmission signal received by the receiving unit based on the gamma correction setting information included in the setting information included in the transmission signal received by the receiving unit, and a stereoscopic image processing unit for selectively performing a process to display the stereoscopic image for the image signal corrected by the gamma correcting unit based on the image type setting information included in the setting information included in the transmission signal received by the receiving unit.

According to such configuration, the image signal processing system capable of realizing the high quality image while preventing the amount of light entering the eyes of the user from decreasing when the image signal is displayed on the display screen is realized.

According to an embodiment of the present invention, it becomes possible to realize the high quality image while preventing the amount of light entering the eyes of the user from decreasing when the image signal is displayed on the display screen.

BRIEF DESCRIPTION OF THE DRAWINGS

FIG. 5 is an explanatory diagram illustrating an example of gamma correction setting information generated by a transmitting device according to the embodiment of the present invention;

FIG. 6 is an explanatory diagram illustrating an example of brightness setting information generated by the transmitting device according to the embodiment of the present invention;

FIG. 10 is an explanatory diagram illustrating an example of image type setting information generated by the transmitting device according to the embodiment of the present invention;

DETAILED DESCRIPTION OF THE EMBODIMENT(S)

Figure 1:
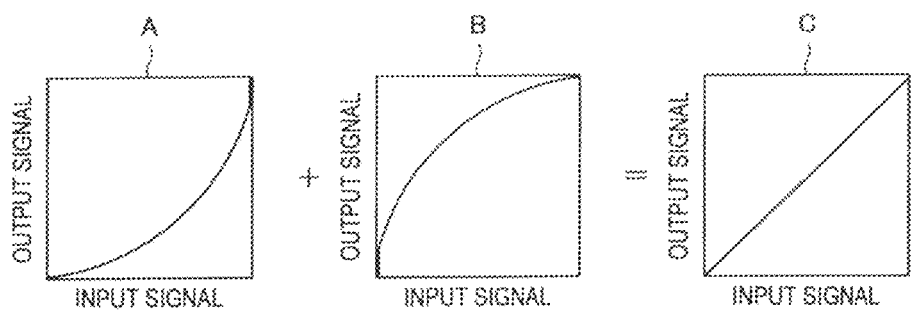
FIG. 1 is an explanatory diagram for illustrating an overview of a high quality image approach according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, a description will be made in the following order.

1. Approach according to embodiment of the present invention

2. Image signal processing system according to embodiment of the present invention 3. Program according to embodiment of the present invention (Approach According to Embodiment of the Present Invention)

A high-quality image approach according to an embodiment of the present invention is described before describing a configuration of each device, which composes an image signal processing system (hereinafter, sometimes referred to as a "image signal processing system 1000") according to the embodiment of the present invention.

As described above, when using a method of preventing an amount of light entering eyes of a user from decreasing and the related technology, an image displayed on a display screen and watched by the user might not sufficiently reflect intention of a contents author side.

Then, in the image signal processing system 1000, a transmitting device (hereinafter, sometimes referred to as a "transmitting device 100") according to the embodiment of the present invention for transmitting an image signal generates setting information for each predetermined unit of the image signal based on the image signal to be transmitted and transmits the setting information together with the image signal. Hereinafter, a signal including the image signal and the setting information for each predetermined unit of the image signal transmitted by the transmitting device 100 is sometimes collectively referred to as a "transmission signal".

In the image signal processing system 1000, an image signal processing device (hereinafter, sometimes referred to as a "image signal processing device 200") according to the embodiment of the present invention, which receives the image signal and the setting information, processes the received image signal and selectively performs control of brightness gradient and/or light source control of a display device based on the received setting information.

Meanwhile, in the image signal processing system 1000 according to the embodiment of the present invention, the transmitting device 100 may transmit an audio signal related to audio corresponding to the image represented by the image signal together with the image signal, and the image signal processing device 200 may process the audio signal. Hereinafter, a process related to the transmission of the audio signal in the transmitting device 100 and a process related to the process of the audio signal in the image signal processing device 200 are not described.

Herein, although there is a digital signal such as a bit stream signal as the image signal according to the embodiment of the present invention, for example, this is not limited to the above description, and may be an analog signal. Hereinafter, a case in which the image signal according to the embodiment of the present invention is the digital signal is described as an example. Further, the image represented by the image signal according to the embodiment of the present invention may be a moving image (flat image/stereoscopic image) and may be a still image (flat image/stereoscopic image).

The predetermined unit of the image signal according to the embodiment of the present invention is a temporally completed unit of the image signal, for example. Although there is a frame, one image unit in an interlace method, one image unit in a progressive method and the like, for example, as the predetermined unit of the image signal according to the embodiment of the present invention, this is not limited to the above description. For example, the predetermined unit of the image signal according to the embodiment of the present invention may be a plurality of frames.

The setting information according to the embodiment of the present invention includes image type setting information, gamma correction setting information and/or brightness setting information. Herein, although the transmitting device 100 may transmit the image type setting information, the gamma correction setting information and the brightness setting information according to the embodiment of the present invention as one setting information (data), for example, this is not limited to the above description. For example, the transmitting device 100 may transmit the image type setting information, the gamma correction setting information and the brightness setting information as separate setting information. In the embodiment of the present invention, both of a case in which the transmitting device 100 transmits various pieces of information as one setting information and a case in which this transmits them as separate setting information as described above are described assuming that "the setting information includes the image type setting information, the gamma correction setting information and/or the brightness setting information".

The image type setting information according to the embodiment of the present invention is information to define whether the image signal represents the stereoscopic image. The image type setting information is used by the image signal processing device 200 to selectively perform a process to display the stereoscopic image. An example of the image type setting information according to the embodiment of the present invention will be described later.

Further, the gamma correction setting information according to the embodiment of the present invention is information to define a gamma correction amount for the image signal. The gamma correction setting information is used by the image signal processing device 200 to perform the control of the brightness gradient. An example of the gamma correction setting information according to the embodiment of the present invention will be described later.

Further, the brightness setting information according to the embodiment of the present invention is information to define the brightness of each part of the display screen. The brightness setting information is used by the image signal processing device 200 to perform the light source control of the display device. An example of the brightness setting information according to the embodiment of the present invention will be described later.

Herein, there is a divided area obtained by dividing the image represented by the image signal into a plurality of areas, for example, as the above-described part of the display screen. Although there is the area obtained by dividing for each pixel of the display device composing the display screen, for example, as the above-described divided area, this is not limited to the above description and this may be the area having a plurality of pixels. Further, the above-described part of the display screen may be a part corresponding to a control unit of the display device of which light emission is controlled by the image signal processing device 200 using a brightness control signal to be described later.

More specifically, in the image signal processing system 1000, the image signal processing device selectively performs the control of the brightness gradient and/or the light source control of the display device based on the received setting information such that when the image represented by the image signal is displayed on the display screen, brightness of a low-brightness portion of the image becomes higher.

FIGS. 1 to 4 are explanatory diagrams for illustrating an overview of the high-quality image approach according to the embodiment of the present invention.

[a] Case in which Image Signal Processing Device 200 does not Perform Control of Brightness Gradient and Light Source Control of Display Device Based on Setting Information FIG. 1 illustrates an example of the gamma correction in the image signal processing device 200 and illustrates an example of the image signal when the image signal processing device 200 does not perform the control of the brightness gradient and the light source control of the display device based on the setting information. FIG. 1A represents an example of a gamma property in the transmitting device 100 and FIG. 1B represents an example of a gamma correction function in the image signal processing device 200. FIG. 1C represents an example of the image signal after the gamma correction in the image signal processing device 200. Further, FIG. 2 illustrates an example when the image represented by the image signal to which the gamma correction illustrated in FIG. 1 is performed is displayed on the display screen in the image signal processing device 200.

Figure 2:
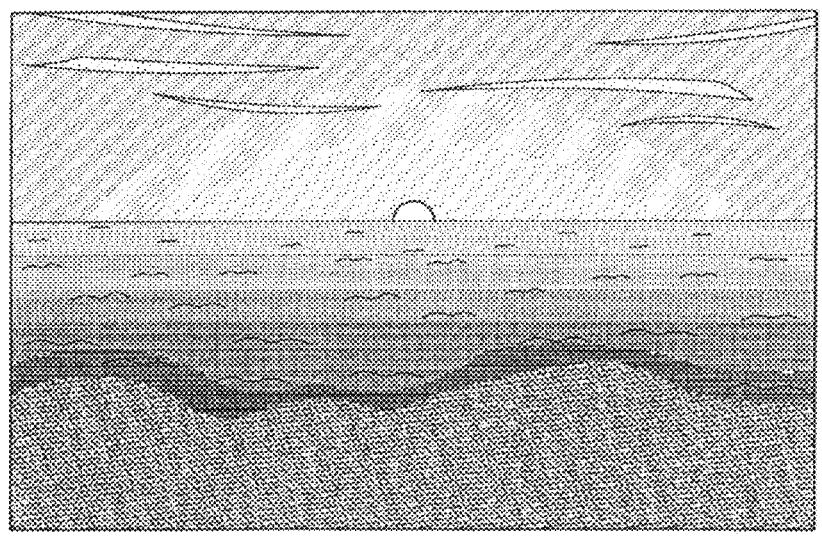
FIG. 2 is an explanatory diagram for illustrating an overview of a high quality image approach according to an embodiment of the present invention.

As represented in FIGS. 1A to 1C, when the image signal processing device 200 does not perform the control of the brightness gradient and the light source control of the display device based on the setting information, the image signal processed by the image signal processing device 200 becomes the image true to the image represented by the image signal transmitted by the transmitting device 100 by the gamma correction (FIG. 2).

Herein, the gamma correction in the image signal processing device 200 is performed by a following equation 1, for example. "x" in the equation 1 represents the image signal to be processed and "y" in the equation 1 represents the image signal after the gamma correction. Further, "γ" in the equation 1 represents a gamma correction value. Herein, although the equation 1 represents an example of the gamma correction when the brightness is divided into 255 levels, this is not limited to the above description.

[Equation 1]

$$y = 255 \cdot \left(\frac{x}{255}\right)^{\frac{1}{\gamma}} \quad \text{(equation 1)}$$

The image signal processing device 200 sets the gamma correction value to a value corresponding to the gamma property in the transmitting device 100 (for example, when the image signal is transmitted by broadcast wave of television broadcasting, γ=2.2 is set), thereby obtaining the image signal represented in FIG. 1C.

Figure 3:
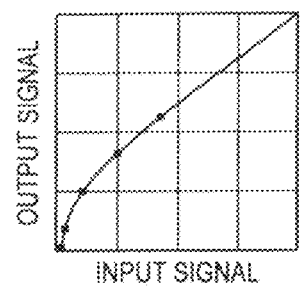
FIG. 3 is an explanatory diagram for illustrating an overview of a high quality image approach according to an embodiment of the present invention.
Figure 4:
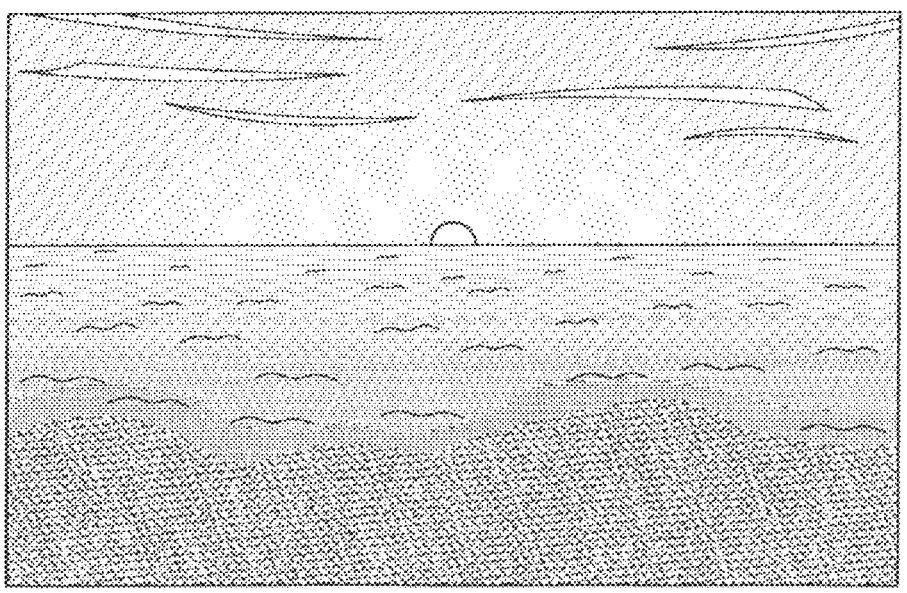
FIG. 4 is an explanatory diagram for illustrating an overview of a high quality image approach according to an embodiment of the present invention.

[b] Case in which Image Signal Processing Device 200 Performs Control of Brightness Gradient and Light Source Control of Display Device Based on the Setting Information FIG. 3 illustrates an example of the image signal when the image signal processing device 200 performs the control of the brightness gradient and/or the light source control of the display device based on the received setting information. Further, FIG. 4 illustrates an example when the image represented by the image signal illustrated in FIG. 3 is displayed on the display screen in the image signal processing device 200.

As illustrated in FIG. 3, the image signal processing device 200 performs the control of the brightness gradient and/or the light source control of the display device based on the setting information such that the brightness of the low-brightness portion becomes higher. The image signal processing device 200 performs the control of the brightness gradient and/or the light source control of the display device such that the brightness of the low-brightness portion becomes higher, and accordingly, the image displayed on the display screen becomes the image of which brightness is higher than that of the image illustrated in FIG. 2, as illustrated in FIG. 4, for example.

[Example of Method of Controlling Brightness Gradient in Image Signal Processing Device 200]

The image signal processing device 200 controls the brightness gradient by setting the value of the gamma correction value γ used in the gamma correction based on the gamma correction setting information included in the received setting information, for example.

FIG. 5 is an explanatory diagram illustrating an example of the gamma correction setting information generated by the transmitting device 100 according to the embodiment of the present invention. Herein, FIG. 5 illustrates an example of the gamma correction setting information according to video usability information (VUI) defined in the ISO/IEC 14490-10.

The transmitting device 100 sets the gamma correction value in "transfer_characteristics" illustrated in FIG. 5 capable of defining a photoelectric transfer function. Although the transmitting device 100 herein directly sets the gamma correction value such as "transfer_characteristics=2.2" and "transfer_characteristics=2.8", for example, this is not limited to the above description. For example, in the VUI of the ISO/IEC14490-10, applicative definition of contents becomes possible by setting to "transfer_characteristics=2". Therefore, the transmitting device 100 may set an optional gamma correction value such as 2.4 by setting as "transfer_characteristics=2" as described above.

Meanwhile, it goes without saying that the gamma correction setting information according to the embodiment of the present invention is not limited to the example illustrated in FIG. 5.

The image signal processing device 200 may perform the control of the brightness gradient based on the setting information by performing the gamma correction using the gamma correction value set in the gamma correction setting information included in the received setting information.

Meanwhile, the method of controlling the brightness gradient in the image signal processing device 200 according to the embodiment of the present invention is not limited to the above description. For example, the image signal processing device 200 according to the embodiment of the present invention may selectively adjust a gain of the image signal for each pixel based on gain adjusting information to define an amount of adjustment of the gain included in the setting information after obtaining the image signal represented in FIG. 1C by the gamma correction.

[Example of Method of Controlling Light Source of Display Device in Image Signal Processing Device 200]

The image signal processing device 200 generates the brightness control signal to control the brightness of each part of the display screen in the display device capable of displaying the image on the display screen for each part based on the brightness setting information included in the received setting information, for example. The image signal processing device 200 then transfers the generated brightness control signal to the display device capable of displaying the image on the display screen.

The light emission in the display device is controlled according to the brightness control signal by the transfer of the brightness control signal to the display device. Therefore, the image signal processing device 200 may transfer the brightness control signal based on the brightness setting information included in the setting information to the display device, thereby controlling the light emission in a light source of the display device.

Herein, although the display device to which the brightness control signal generated by the image signal processing device 200 is transferred may be provided in the image signal processing device 200, for example, this is not limited to the above description. For example, the image signal processing device 200 may transmit the generated brightness control signal to the display device as an external device. When the image signal processing device 200 is provided with the display device (corresponding to a display unit to be described later), the image signal processing device 200 serves as the display device.

Although there is a liquid crystal display (LCD) having the light source capable of emitting light for each area corresponding to each pixel or a plurality of pixels, for example, as the display device according to the embodiment of the present invention, this is not limited to the above description. For example, the display device according to the embodiment of the present invention may be a self-emitting type display device without a separate light source such as an organic electroluminescence display (organic EL display, also referred to as an organic light emitting diode display (OLED display)). Hereinafter, a case in which the image signal processing device 200 generates the brightness control signal to control the light emission in the light source provided in the display device is described as an example.

FIG. 6 is an explanatory diagram illustrating an example of the brightness setting information generated by the transmitting device 100 according to the embodiment of the present invention. Herein, FIG. 6 illustrates an example of the brightness setting information according to User_data_unregistered SEI (supplemental enhancement information) defined in the ISO/IEC14496-10.

Herein, "MacroBlock_ID" illustrated in FIG. 6 is information to identify a macroblock (example of the divided area) in the image represented by the image signal. A numerical value given in a scan order and in an ascending order from upper left to lower right is set in "MacroBlock_ID" illustrated in FIG. 6, for example. Therefore, the image signal processing device 200, which receives the brightness setting information, may uniquely distinguish a horizontal-vertical position by the above-described numerical value.

Further, the transmitting device 100 sets information of an average brightness level of the macroblock (example of the divided area) corresponding to each "MacroBlock_ID" illustrated in FIG. 6 in "Averaged_Luma_level" illustrated in FIG. 6. Therefore, the image signal processing device 200, which receives the brightness setting information, may uniquely specify a brightness level to be set for each macroblock (example of the divided area), so that this may generate the brightness control signal corresponding to the brightness setting information for each part of the display screen.

Meanwhile, it goes without saying that the brightness setting information according to the embodiment of the present invention is not limited to the example illustrated in FIG. 6.

The image signal processing device 200 may generate the brightness control signal for each part (each divided area) of the display screen using information of the brightness level for each divided area set in the brightness setting information included in the received setting information to transfer to the display device, thereby controlling the light emission in the light source of the display device based on the setting information. Meanwhile, it goes without saying that the method of controlling the light source of the display device in the image signal processing device 200 according to the embodiment of the present invention is not limited to above description.

In the image signal processing system 1000, the control of the brightness gradient and/or the light source control of the display device is performed as described above, for example, in the image signal processing device 200. Therefore, in the image signal processing system 1000, the amount of light entering the eyes of the user may be prevented from decreasing when the image processed by the image signal processing device 200 is displayed on the display screen of the display device.

Further, in the image signal processing system 1000, the image signal processing device 200 performs the control of the brightness gradient and/or the light source control of the display device based on the setting information transmitted by the transmitting device 100 as described above. That is to say, in the image signal processing device 200 according to the embodiment of the present invention, the control of the brightness gradient and/or the light source control of the display device is not freely performed based on the received image signal as in the case of using the method of preventing the amount of light entering the eyes of the user from decreasing.

Therefore, in the image signal processing system 1000, possibility that the image displayed on the display screen and watched by the user does not sufficiently reflect the intention of the contents author side may be further reduced, so that the higher quality image may be realized.

Meanwhile, it goes without saying that the image signal processing device 200 according to the embodiment of the present invention is further capable of performing the above-described control by user operation using an operating device provided in the image signal processing device 200, for example, in addition to the control of the brightness gradient and/or the light source control of the display device based on the received setting information. In a case of the above-described configuration, the image signal processing system according to the embodiment of the present invention may reflect intention of the user who watches the image while reflecting the intention of the contents author side on the image displayed on the display screen and watched by the user.

As described above, in the image signal processing system 1000, the transmitting device 100 transmits the image signal and the setting information for each predetermined unit. The image signal processing device 200 then processes the received image signal and selectively performs the control of the brightness gradient and/or the light source control of the display device based on the received setting information. Therefore, in the image signal processing system 1000, it is possible to realize the high quality image while preventing the amount of light entering the eyes of the user from decreasing when the image signal is displayed on the display screen.

Meanwhile, although the case in which the image signal processing device 200 composing the image signal processing system 1000 processes the received transmission signal is described above, this is not limited to above description. For example, the image signal processing device 200 according to the embodiment of the present invention may store contents data (data including data corresponding to the image signal and the setting information) corresponding to the received transmission signal in a storage medium (for example, a storage unit to be described later). In the above-described case, the image signal processing device 200 may selectively perform the control of the brightness gradient and/or the light source control of the display device as in the above-described case based on the setting information included in the stored contents data.

(Image Signal Processing System According to Embodiment of the Present Invention)

Figure 7:
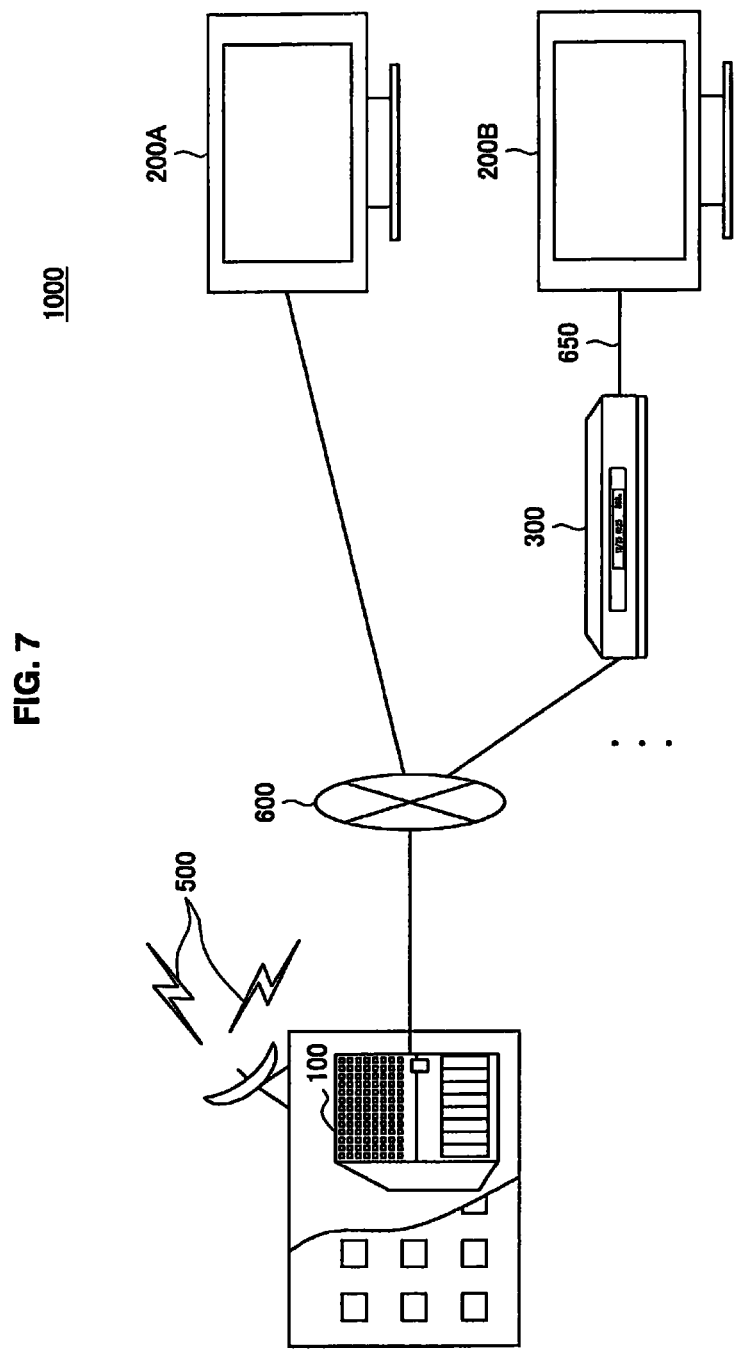
FIG. 7 is an explanatory diagram for illustrating an overview of an image signal processing system according to the embodiment of the present invention.

Next, a configuration example of the image signal processing system 1000 capable of realizing the above-described high-quality image approach according to the embodiment of the present invention is described. FIG. 7 is an explanatory diagram for illustrating an overview of the image signal processing system 1000 according to the embodiment of the present invention.

With reference to FIG. 7, the image signal processing system 1000 has the transmitting device 100, image signal processing devices 200A, 200B . . . (hereinafter, sometimes collectively referred to as the "image signal processing device 200") and a receiving device 300.

Herein, although a television receiving set capable of (directly/indirectly) receiving a broadcast wave 500 on which the transmission signal transmitted by the transmitting device 100 from a television tower and the like is put and displaying the image (moving image/still image) based on the image signal included in the received transmission signal is illustrated in FIG. 7 as the image signal processing devices 200A and 200B, this is not limited to the above description.

Although a set top box is illustrated in FIG. 7 as the receiving device 300 capable of (directly/indirectly) receiving the broadcast wave 500 transmitted by the transmitting device 100 from the television tower and the like, this is not limited to the above description.

Herein, direct reception of the transmission signal related to the broadcast wave 500 is intended to mean the reception of the broadcast wave 500 by each device such as the image signal processing device 200 and the receiving device 300, for example. Further, indirect reception of the transmission signal related to the broadcast wave 500 in the image signal processing device 200 is intended to mean the reception of the transmission signal transferred from an external antenna, which receives the broadcast wave 500, by the image signal processing device 200 or the reception of the transmission signal through the receiving device 300, for example. Further, the indirect reception of the transmission signal related to the broadcast wave 500 in the receiving device 300 is intended to mean the reception of the transmission signal transferred from the external antenna, which receives the broadcast wave 500, by the receiving device 300, for example.

The transmitting device 100, the image signal processing device 200A and the receiving device 300 are connected to one another through a network 600 (or directly). Further, the image signal processing device 200B and the receiving device 300 are connected to each other by a connection interface 650. Herein, the term "connect" according to the embodiment of the present invention is intended to mean that the devices are in a communicable state (or put in the communicable state), for example.

Although there is a wired network such as a local area network (LAN) and a wide area network (WAN), a wireless network such as wireless wide area network (WWAN) and wireless metropolitan area network (WMAN) through a base station, or an Internet using a communication protocol such as a transmission control protocol/Internet protocol (TCP/IP), for example, as the network 600, this is not limited to the above description.

Although there is a high-definition multimedia interface (HDMI) as the connection interface 650, for example, this is not limited to the above description. For example, the connection interface 650 may be a universal serial bus (USB), an interface using a D terminal and an interface using an optical digital audio terminal.

Meanwhile, although the example in which the transmitting device 100 performs both of the transmission of the image signal through the broadcast wave 500 and the transmission of the image signal through the network 600 is illustrated in FIG. 7, this is not limited to the above description. The transmitting device 100 according to the embodiment of the present invention may transmit the image signal through the broadcast wave 500 and/or transmit the image signal through the network 600.

As illustrated in FIG. 7, the image signal processing device 200 may receive the transmission signal transmitted from the transmitting device 100 through the receiving device 300 and may receive the transmission signal without the receiving device 300.

Hereinafter, a configuration example of each device composing the image signal processing system 1000 is described. Further, hereinafter, an example of a configuration to receive the transmission signal without the receiving device 300 (image signal processing device 200A) and a configuration to receive the transmission signal through the receiving device 300 (image signal processing device 200B) is described as a configuration example of the image signal processing device 200.

[Transmitting Device 100]

Figure 8:
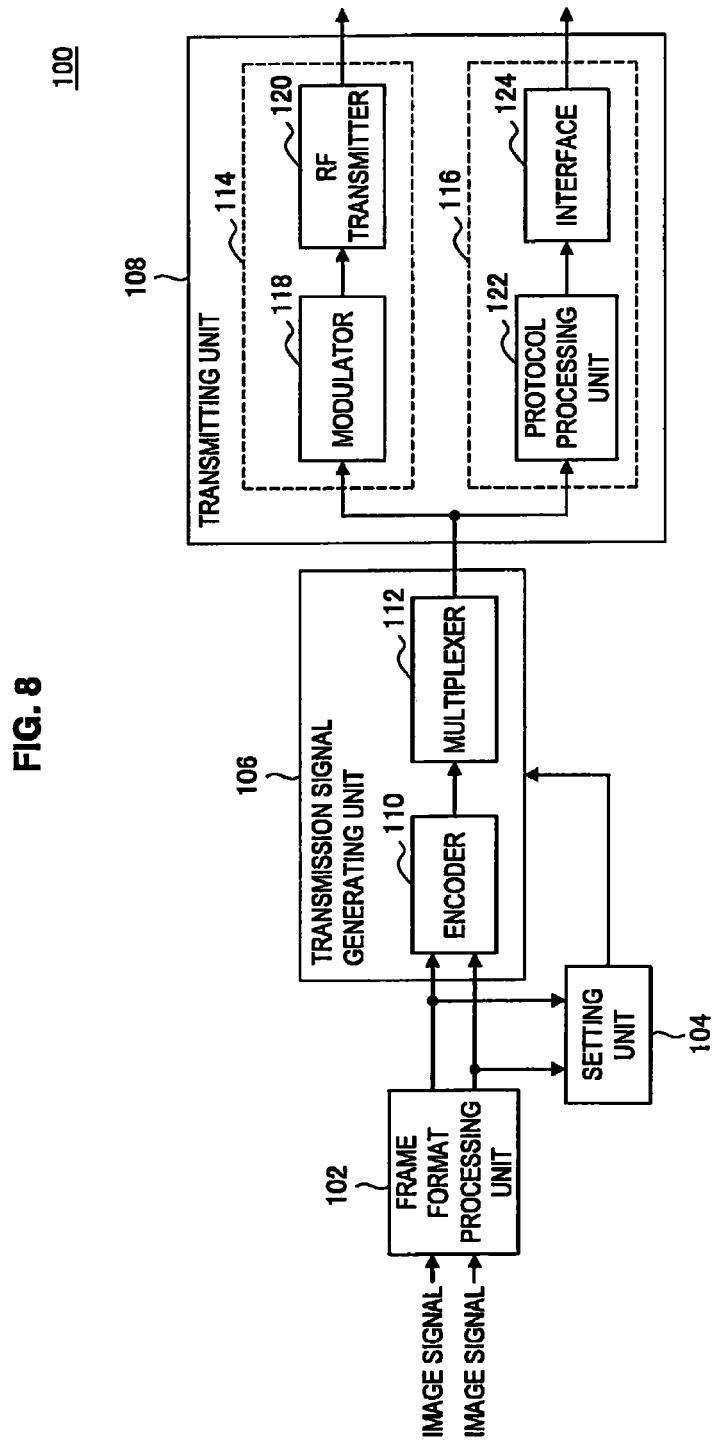
FIG. 8 is an explanatory diagram for illustrating an example of a configuration of the transmitting device according to the embodiment of the present invention.

FIG. 8 is an explanatory diagram illustrating an example of a configuration of the transmitting device 100 according to the embodiment of the present invention. With reference to FIG. 8, the transmitting device 100 is provided with a frame format processing unit 102, a setting unit 104, a transmission signal generating unit 106 and a transmitting unit 108.

Further, the transmitting device 100 may be provided with a controller (not illustrated), a read only memory (ROM; not illustrated), a random access memory (RAM; not illustrated), the storage unit (not illustrated), an operating unit, which a user of the transmitting device 100 may operate (not illustrated), a display unit to display various screens on the display screen (not illustrated) and the like, for example. The transmitting device 100 connects the above-described components by a bus as a transmission path of data, for example.

Herein, the controller (not illustrated) is composed of a micro processing unit (MPU), various processing circuits and the like, for example, to control an entire transmitting device 100. Further, the controller (not illustrated) may serve as the frame format processing unit 102, the setting unit 104 and the transmission signal generating unit 106, for example.

The ROM (not illustrated) stores control data such as a program and an arithmetic parameter used by the controller (not illustrated). The RAM (not illustrated) temporarily stores the program executed by the controller (not illustrated) and the like. Although there is a magnetic recording medium such as a hard disk, and a nonvolatile memory such as an electrically erasable and programmable read only memory (EEPROM), a flash memory, a magnetoresistive random access memory (MRAM), a ferroelectric random access memory (FeRAM) and a phase change random access memory (PRAM) as the storage unit (not illustrated), for example, this is not limited to the above description.

Although there is a rotary selector such as a button, a direction key and a jog dial or combination of them, for example, as the operating unit (not illustrated), this is not limited to the above description. Although there is the liquid crystal display and the organic EL display, for example, as the display unit (not illustrated), this is not limited to the above description. Further, the transmitting device 100 may be connected to an operation input device (keyboard and a mouse, for example) and a display device (external display, for example) as external devices of the transmitting device 100.

The frame format processing unit 102 converts the image signal to be transmitted into a predetermined frame format corresponding to the transmission signal.

Herein, although there is the image signal obtained by imaging transferred from an imaging device such as a camera, for example, as the image signal to be transmitted processed by the frame format processing unit 102, this is not limited to the above description. For example, the image signal to be transmitted processed by the transmitting device 100 according to the embodiment of the present invention may be the image signal received from the external device through the network 600 and the like, and may be the image signal based on the contents data stored in the storage unit (not illustrated).

Although it is illustrated in FIG. 8 that two image signals are input to the frame format processing unit 102, this is not limited to the above description. For example, when the image signal input to the frame format processing unit 102 represents the flat image, any one of the image signals illustrated in FIG. 8 is input. That is to say, the frame format processing unit 102 processes both of the image signal corresponding to the stereoscopic image (when two image signals are input) and the image signal corresponding to the flat image (when one image signal is input). Further, the number of the image signals output from the frame format processing unit 102 corresponds to the number of the input image signals.

The setting unit 104 sets set values to be set in the image type setting information, the gamma correction setting information and/or the brightness setting information based on the image signal output from the frame format processing unit 102 (image signal to be transmitted). Then, the setting unit 104 transfers the image type setting information, the gamma correction setting information and/or the brightness setting information in which each set value is set to the transmission signal generating unit 106.

Meanwhile, in the transmitting device 100 according to the embodiment of the present invention, the setting unit 104 may transfer each set value to the transmission signal generating unit 106 and the transmission signal generating unit 106 may generate the image type setting information, the gamma correction setting information and/or the brightness setting information. Hereinafter, a case in which the setting unit 104 generates the image type setting information, the gamma correction setting information and/or the brightness setting information to transfer to the transmission signal generating unit 106 is described as an example.

Herein, although the setting unit 104 sets both of or any one of the set value to be set in the gamma correction setting information and the set value to be set in the brightness setting information, for example, in addition to the set value to be set in the image type setting information, this is not limited to the above description. For example, it is possible that the setting unit 104 does not perform the process related to the setting of the set values to be set in the gamma correction setting information and the brightness setting information based on an operation signal corresponding to the user operation transferred from the operating unit (not illustrated) and information defining not to perform the process included in the image signal.

Although the setting unit 104 sets the set value corresponding to the information defined in advance out of the set values to be set in the gamma correction setting information and the brightness setting information, for example, this is not limited to the above description. For example, the setting unit 104 may selectively switch the information in which the set value is set based on the operation signal according to the user operation transferred from the operating unit (not illustrated).

Hereinafter, a case in which the setting unit 104 sets the set values to be set in the image type setting information, the gamma correction setting information and the brightness setting information is described as an example.

[Example of Setting Process in Setting Unit 104]

Figure 9:
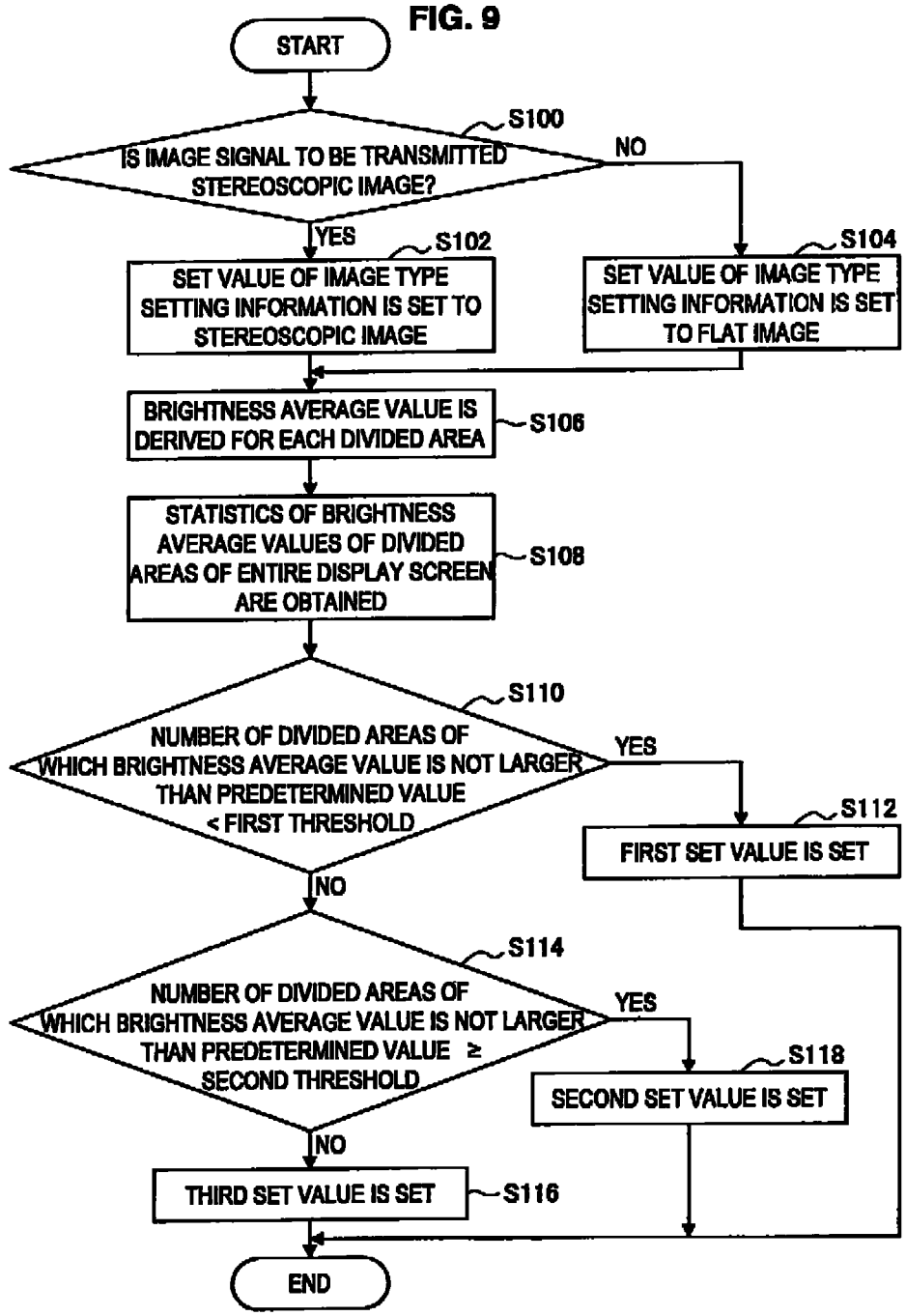
FIG. 9 is a flowchart illustrating an example of a setting process in a setting unit of the transmitting device according to the embodiment of the present invention.

FIG. 9 is a flowchart illustrating an example of a setting process in the setting unit 104 of the transmitting device 100 according to the embodiment of the present invention. Hereinafter, it is described on the assumption that the setting process illustrated in FIG. 9 is performed by the transmitting device 100.

The transmitting device 100 judges whether the image signal to be transmitted represents the stereoscopic image (S100). Herein, although the transmitting device 100 judges that the image signal to be transmitted represents the stereoscopic image when processing a plurality of image signals, for example, this is not limited to the above description.

When it is judged that the image signal to be transmitted represents the stereoscopic image in step S100, the transmitting device 100 sets the set value of the image type setting information to the stereoscopic image (S102). Further, when it is not judged that the image signal to be transmitted represents the stereoscopic image in step S100, the transmitting device 100 sets the set value of the image type setting information to the flat image (S104).

FIG. 10 is an explanatory diagram illustrating an example of the image type setting information generated by the transmitting device 100 according to the embodiment of the present invention.

When it is judged that the image signal to be transmitted represents the stereoscopic image in step S100, the transmitting device 100 sets "3D_flag" illustrated in FIG. 10, which is a flag indicating whether it is the stereoscopic image, to a state indicating the stereoscopic image in step S102. Further, when it is not judged that the image signal to be transmitted represents the stereoscopic image in step S100, the transmitting device 100 sets "3D_flag" illustrated in FIG. 10 to a state indicating the flat image (state not indicating the stereoscopic image) in step S104. Herein, although the transmitting device 100 sets "3D_flag" illustrated in FIG. 10 to "1" and "0" when the image signal represents the stereoscopic image and the flat image, respectively, for example, this is not limited to the above description.

Further, when it is judged that the image signal to be transmitted represents the stereoscopic image in step S100, the transmitting device 100 sets the set values of various pieces of information related to the image signal to be set in the image type setting information based on the image signal to be transmitted and the contents of the process performed in the transmission signal generating unit 106, for example.

Herein, although there is a flag indicating whether it is a frame or a field ("Frame_flag" in FIG. 10), a flag indicating a format of the stereoscopic image ("3D_video_format" in FIG. 10) and a flag indicating whether a current image signal is a right-eye image signal or a left-eye image signal ("Current_image_is_L" in FIG. 10), for example, as the information set by the transmitting device 100, this is not limited to the above description. For example, the transmitting device 100 may set the various pieces of information related to the process of the stereoscopic image in the image signal processing device 200, which receives the image type setting information, in addition to flags "3D_pair_Image", "Lefthand_side_is_L" and "Top_is_L" illustrated in FIG. 10.

Further, the image signal processing device 200, which receives the setting information including the image type setting information illustrated in FIG. 10, may uniquely judge whether the image signal to be processed represents the stereoscopic image based on "3D_flag" set in the image type setting information. Therefore, when it is judged that the image signal to be processed represents the stereoscopic image, the image signal processing device 200 may selectively perform the process to display the stereoscopic image for the image signal based on the various pieces of information set in the image type setting information.

Meanwhile, it goes without saying that the image type setting information according to the embodiment of the present invention is not limited to the example illustrated in FIG. 10.

An example of the setting process in the setting unit 104 of the transmitting device 100 is described with reference to FIG. 9 again. When the set value for the image type setting information is set in step S102 or the step S104, the transmitting device 100 derives a brightness average for each divided area based on the image signal (S106).

When the brightness average value for each divided area is derived in step S106, statistics on the brightness average values of the divided areas of the entire display screen are obtained (S108). Herein, although frequency distribution of the brightness average values of the divided areas is derived as statistical processing in step S108, for example, this is not limited to the above description.

When the statistics on the brightness average values of the divided areas of the entire display screen are obtained in step S108, the transmitting device 100 judges whether "number of divided areas of which brightness average value is not larger than predetermined value<first threshold" (S110). Herein, although values defined in advance may be used as the predetermined value related to the brightness average value, the first threshold and a second threshold to be described later (first threshold>second threshold), this is not limited to the above description. For example, the above-described values may be appropriately set based on the operation signal corresponding to the user operation transferred from the operating unit (not illustrated).

When it is judged that "number of divided areas of which brightness average value is not larger than predetermined value<first threshold" in step S110, the transmitting device 100 assumes that the image represented by the image signal is sufficiently bright as a whole and sets first set values in the gamma correction setting information and the brightness setting information (S112).

Herein, as the first set value according to the embodiment of the present invention, there is the set value for not allowing the image signal processing device 200 to perform the control of the brightness gradient and the light source control of the display device based on the setting information, for example. More specifically, the transmitting device 100 sets the gamma correction value to be set in the gamma correction setting information to 2.2, for example. Further, the transmitting device 100 sets the information of the average brightness level to be set in the brightness setting information to a value corresponding to the brightness average value derived in step S106, for example. Meanwhile, the value set as the first set value by the transmitting device 100 and a type of the set value are not limited to the above description. For example, the transmitting device 100 may set the set values to be set in the various pieces of information composing the gamma correction setting information illustrated in FIG. 5 and the various pieces of information composing the brightness setting information illustrated in FIG. 6.

Further, in step S110, when it is not judged that "number of divided areas of which brightness average value is not larger than predetermined value<first threshold", the transmitting device 100 judges whether "number of divided areas of which brightness average value is not larger than predetermined value≥second threshold" (S114).

At the step S114, when it is judged that "number of divided areas of which brightness average value is not larger than predetermined value≥second threshold", the transmitting device 100 assumes that there is a dark portion in the image represented by the image signal and sets second set values in the gamma correction setting information and the brightness setting information (S116).

Herein, as the second set value according to the embodiment of the present invention, there is the set value for not allowing the image signal processing device 200 to perform the control of the brightness gradient based on the setting information but allowing the same to perform the light source control of the display device, for example. More specifically, the transmitting device 100 sets the gamma correction value to be set in the gamma correction setting information to 2.2, for example. Further, the transmitting device 100 sets the information of the average brightness level to be set in the brightness setting information, for example, to a value higher than the value corresponding to the brightness average value derived in step S106. Meanwhile, the value set as the second set value by the transmitting device 100 and a type of the set value are not limited to the above description. For example, the transmitting device 100 may set the set value for allowing the image signal processing device 200 to perform the control of the brightness gradient based on the setting information and not allowing the same to perform the light source control of the display device as the second set value.

Further, when it is not judged that "number of divided areas of which brightness average value is not larger than predetermined value≥second threshold" in step S114, the transmitting device 100 assumes that there is a larger dark portion in the image represented by the image signal and sets third set values in the gamma correction setting information and the brightness setting information (S118).

Herein, as the third set value according to the embodiment of the present invention, there is a set value for allowing the image signal processing device 200 to perform the control of the brightness gradient and the light source control of the display device based on the setting information, for example. More specifically, the transmitting device 100 sets the gamma correction value to be set in the gamma correction setting information to a value larger than 2.2, for example. Further, the transmitting device 100 sets the information of the average brightness level to be set in the brightness setting information to a value higher than the value corresponding to the brightness average value derived in step S106, for example. Meanwhile, the value set by the transmitting device 100 as the third set value and a type of the set value are not limited to the above description.

The transmitting device 100 may set the set values to be set in the image type setting information, the gamma correction setting information and the brightness setting information by performing the process illustrated in FIG. 9, for example. Meanwhile, the setting process in the setting unit 104 of the transmitting device 100 according to the embodiment of the present invention is not limited to the example illustrated in FIG. 9. For example, although the configuration in which the transmitting device 100 performs the setting process using the two predetermined thresholds is illustrated in FIG. 9, this is not limited to the above description, and the transmitting device 100 according to the embodiment of the present invention may perform the setting process by setting the set values of "number of thresholds+1 pattern" using one or two or more predetermined threshold.

An example of the configuration of the transmitting device 100 is described with reference to FIG. 8 again. The transmission signal generating unit 106 generates the transmission signal based on the image signal transferred from the frame format unit 102, the image type setting information, the gamma correction setting information and the brightness setting information transferred from the setting unit 104. The transmission signal generating unit 106 then transfers the generated transmission signal to the transmitting unit 108.

Herein, although the transmission signal generating unit 106 is composed of an encoder 110 for encoding the image signal based on a predetermined rule and a multiplexer 112 for outputting the transmission signal based on the image signal and the setting information encoded by the encoder 110, this is not limited to the above description.

The transmitting unit 108 transmits the transmission signal transferred from the transmission signal generating unit 106.

Herein, although the configuration in which the transmitting unit 108 is provided with a first transmitting unit 114 for transmitting the transmission signal through the broadcast wave 500 and a second transmitting unit 116 for transmitting the transmission signal through the network 600 is illustrated in FIG. 8, this is not limited to the above description. For example, the transmitting device according to the embodiment of the present invention may be provided with any one of the first transmitting unit 114 and the second transmitting unit 116.

Although the first transmitting unit 114 is composed of a modulator 118 and a radio frequency (RF) transmitter 120, for example, this is not limited to the above description. Although the second transmitting unit 116 is composed of a protocol processing unit 122 and an interface 124 for connecting to the network 600, for example, this is not limited to the above description.

The transmitting device 100 may generate the setting information for each predetermined unit of the image signal based on the image signal to be transmitted to transmit the image signal and the setting information with the configuration illustrated in FIG. 8, for example. Meanwhile, it goes without saying that the configuration of the transmitting device according to the embodiment of the present invention is not limited to the configuration illustrated in FIG. 8.

[Image Signal Processing Device 200]

Next, a configuration of the image signal processing device 200 according to the embodiment of the present invention is described.

[1] First Configuration Example (Configuration Example Corresponding to Image Signal Processing Device 200A)

Figure 11:
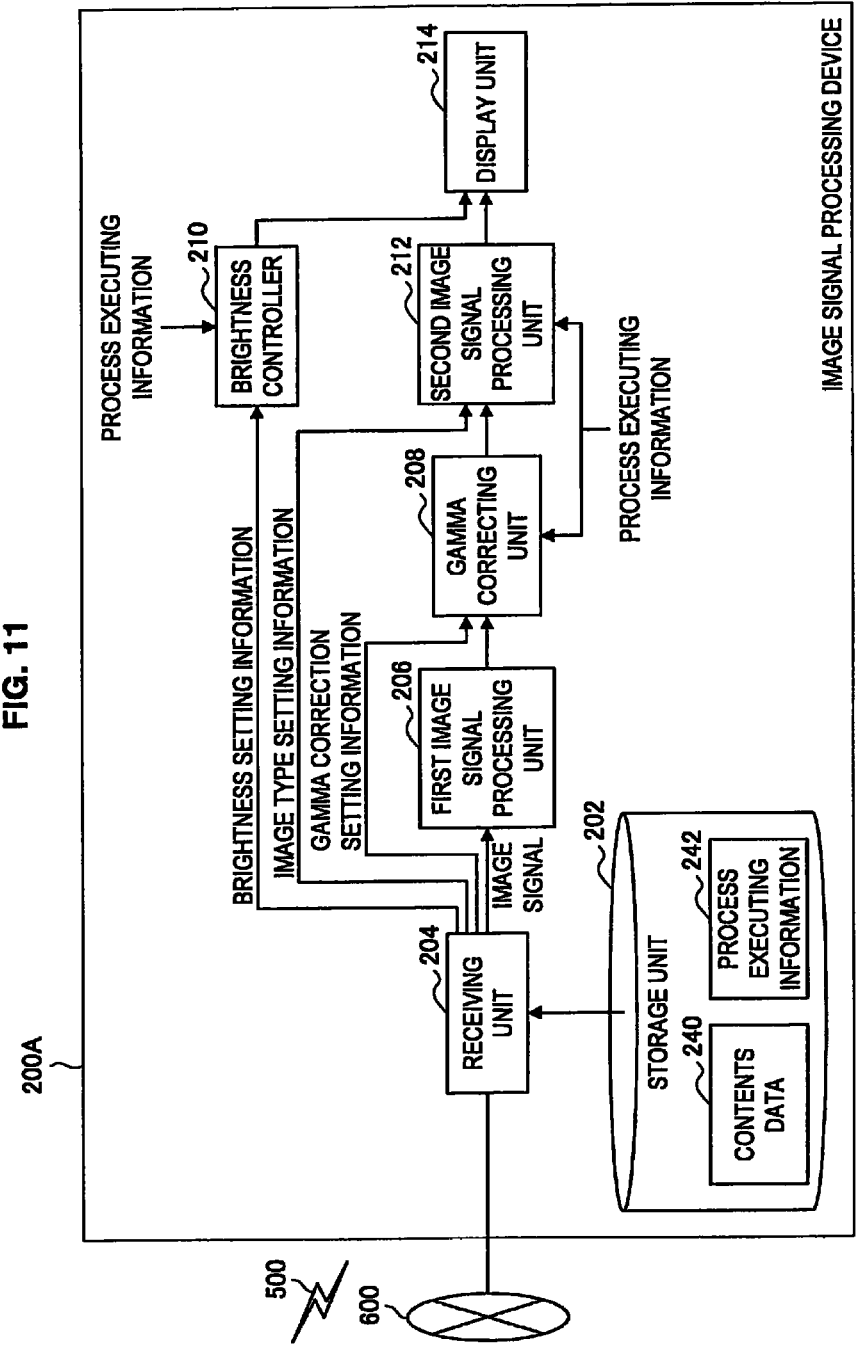
FIG. 11 is an explanatory diagram for illustrating a first example of a configuration of an image signal processing device according to the embodiment of the present invention.

FIG. 11 is an explanatory diagram illustrating a first example of the configuration of the image signal processing device 200 according to the embodiment of the present invention. Herein, FIG. 11 illustrates an example of a configuration of the image signal processing device 200A for receiving the transmission signal transmitted from the transmitting device 100 without the receiving device 300 as the configuration related to the first example of the image signal processing device 200.

Although the configuration in which the image signal processing device 200A has both of a control function of the brightness gradient based on the received setting information and a light source control function of the display device based on the setting information illustrated in FIG. 11, this is not limited to the above description. As described above, the image signal processing device according to the embodiment of the present invention may be configured to have any one of the control function of the brightness gradient based on the received setting information and the light source control function of the display device based on the setting information.

The image signal processing device 200A is provided with a storage unit 202, a receiving unit 204, a first image signal processing unit 206, a gamma correcting unit 208, a brightness adjusting unit 210, a second image signal processing unit 212 (stereoscopic image processing unit) and a display unit 214.

Further, the image signal processing device 200A may be provided with a controller (not illustrated), the ROM (not illustrated), the RAM (not illustrated), an operating unit (not illustrated), which may be operated by the user of the image signal processing device 200A, an external communicating unit (not illustrated) for communicating with the external device for allowing the user to watch the stereoscopic image, such as liquid crystal shutter glasses and the like. The image signal processing device 200A connects the above-described components by the bus as the transmission path of the data, for example.

Herein the controller (not illustrated) is composed of the MPU, the various processing circuits and the like, for example, to control an entire image signal processing device 200A. Further, the controller (not illustrated) may serve as the first image signal processing unit 206, the gamma correcting unit 208, the brightness adjusting unit 210 and the second image signal processing unit 212, for example.

The ROM (not illustrated) stores the control data such as the program and the arithmetic parameter used by the controller (not illustrated). The RAM (not illustrated) temporarily stores the program and the like executed by the controller (not illustrated). Although there is the rotary selector such as the button, the direction key and the jog dial or combination of them, for example, as the operating unit (not illustrated), this is not limited to the above description. Although there is an IEEE 802.15.1 port and a transmitting and receiving circuit (wireless communication), an IEEE 802.11b port and the transmitting and receiving circuit (wireless communication) and the like, for example, as the external communicating unit (not illustrated), this is not limited to the above description.

The storage unit 202 is storing means provided in the image signal processing device 200A. Herein, although there is the magnetic recording medium such as the hard disk and the nonvolatile memory such as the flash memory, for example, as the storage unit 202, this is not limited to the above description.

The storage unit 202 stores various data such as the contents data corresponding to the received transmission signal, the contents data independent of the received transmission signal, process executing information and various applications, for example. Herein, although the example in which contents data 240 corresponding to the received transmission signal and process executing information 242 are stored in the storage unit 202 is illustrated in FIG. 11, this is not limited to the above description. For example, the image signal processing device 200 according to the embodiment of the present invention may store the process executing information in a storage medium separate from the storage unit 202 such as the above-described ROM, for example.

Herein, the process executing information according to the embodiment of the present invention is information for selectively executing the control of the brightness gradient based on the setting information, the light source control of the display device based on the setting information and the process to display the stereoscopic image according to the embodiment of the present invention, for example. When it is defined in the process executing information to limit execution of the control and the like, the image signal processing device 200 according to the embodiment of the present invention does not execute the control and the like. As described above, the image signal processing device 200 according to the embodiment of the present invention stores the process executing information, so that, the image signal processing device 200 may selectively activate the function of the image signal processing device 200 without depending on the setting information included in the received transmission signal, for example. Further, the image signal processing device 200 stores the process executing information as described above, so that, the image signal processing device 200 may perform the process corresponding to the function of the device itself without depending on the setting information also when this does not have the control function corresponding to the received setting information, for example.

The receiving unit 204 receives the transmission signal and transfers the image signal and the setting information included in the transmission signal to the corresponding components. More specifically, the receiving unit 204 transfers the image signal to the first image signal processing unit 206 and transfers the image type setting information to the second image signal processing unit 212. Further, the receiving unit 204 transfers the gamma correction setting information to the gamma correcting unit 208 and transfers the brightness setting information to the brightness controller 210.

[Configuration Example of Receiving Unit 204]

Figure 12:
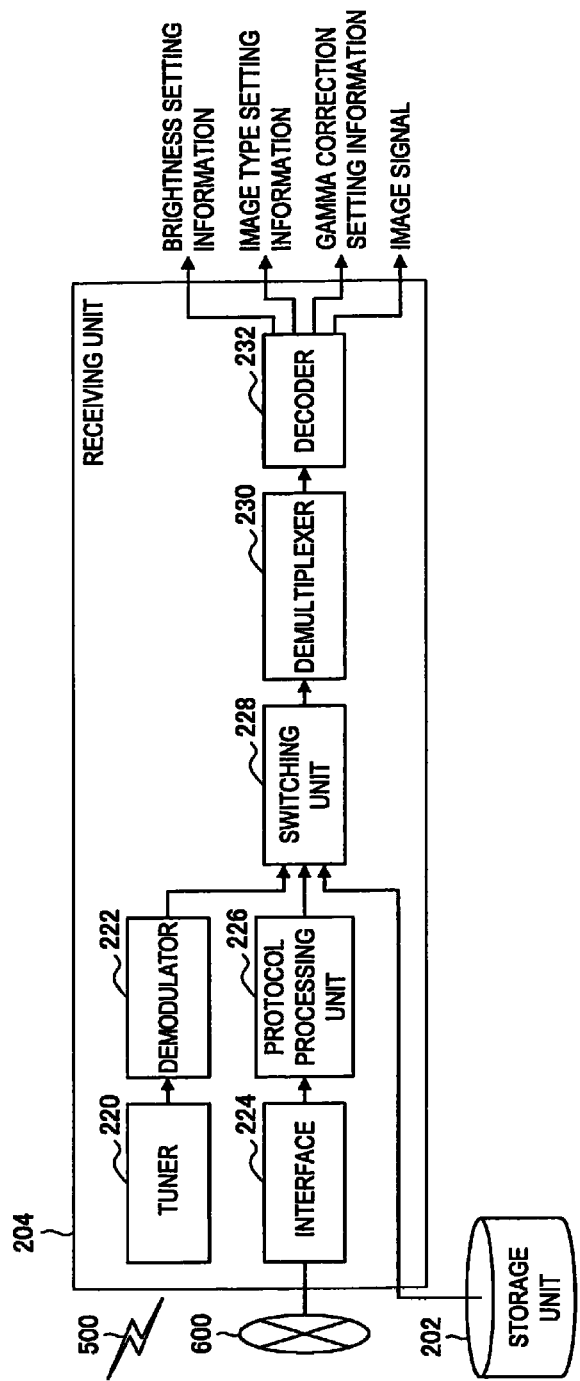
FIG. 12 is an explanatory diagram illustrating an example of a configuration of a receiving unit provided in the image signal processing device according to the embodiment of the present invention.

FIG. 12 is an explanatory diagram illustrating an example of a configuration of the receiving unit 204 provided in the image signal processing device 200 according to the embodiment of the present invention. Herein, FIG. 12 illustrates an example of a configuration in which the image signal processing device 200 has a function to receive the transmission signal through the broadcast wave 500, a function to receive the transmission signal through the network 600 and a function to process the contents data stored in the storage unit 202.

The receiving unit 204 is provided with a tuner 220, a demodulator 222, an interface 224, a protocol processing unit 226, a switching unit 228, a demultiplexer 230 and a decoder 232.

The tuner 220 and the demodulator 222 serve to receive the transmission signal through the broadcast wave 500. Further, the interface 224 and the protocol processing unit 226 serve to receive the transmission signal through the network 600.

The transmission signal transferred from the demodulator 222, the transmission signal transferred from the protocol processing unit 226 and the contents data stored in the storage unit 202 are input to the switching unit 228, and this selectively transfers any one of them to the demultiplexer 230. Hereinafter, a case in which the switching unit 228 transfers the transmission signal to the demultiplexer 230 is described as an example.

Herein, although the switching unit 228 switches the transmission signal and the like to be output based on the operation signal corresponding to the user operation transferred from the operating unit (not illustrated), for example, this is not limited to the above description.

The demultiplexer 230 divides the image signal and the setting information (image type setting information, gamma correction setting information and brightness setting information) based on the transmission signal transferred from the switching unit 228, and transfers the image signal and the setting information to the decoder 232. Herein, when the setting information is not included in the transmission signal and the contents data, the demultiplexer 230 does not transfer the setting information to the decoder 232.

The decoder 232 decodes the image signal and the setting information transferred from the demultiplexer 230 to transfer the decoded image signal, image type setting information, gamma correction setting information and brightness setting information to the corresponding components.

The receiving unit 204 may transfer the image signal and the setting information included in the transmission signal to the corresponding components with the configuration illustrated in FIG. 12, for example. Meanwhile, it goes without saying that the configuration of the receiving unit provided in the image signal processing device 200 according to the embodiment of the present invention is not limited to the configuration illustrated in FIG. 12.

The first configuration example of the image signal processing device 200 is described with reference to FIG. 11 again. The first image signal processing unit 206 processes the image signal transferred from the receiving unit 206 and transfers the processed image signal to the gamma correcting unit 208.

Herein, although there is a scaling process, an interlace/progressive conversion process and the like, for example, as the process in the first image signal processing unit 206, this is not limited to the above description.

The gamma correcting unit 208 serves to control the brightness gradient based on the setting information. More specifically, the gamma correcting unit 208 performs the gamma correction for the image signal based on the gamma correction setting information transferred from the receiving unit 204 and the image signal transferred from the first image signal processing unit 206.

Further, the gamma correcting unit 208 may selectively perform the control of the brightness gradient based on the setting information based on the process executing information.

The brightness controller 210 serves to perform the light source control of the display device based on the setting information. More specifically, the brightness controller 210 generates the brightness control signal based on the image signal (not illustrated in FIG. 11) transferred from the first image signal processing unit 206 and the brightness setting information transferred from the receiving unit 204 and transfers the brightness control signal to the display unit 214, for example.

Further, the brightness controller 210 may selectively perform the light source control of the display device based on the setting information based on the process executing information.

The second image signal processing unit 212 selectively performs the process to display the stereoscopic image for the image signal transferred from the gamma correcting unit 208 based on the image type setting information transferred from the receiving unit 204. More specifically, the second image signal processing unit 212 judges whether the image signal represents the stereoscopic image based on "3D_flag" of the image type setting information illustrated in FIG. 10 and performs the process to display the stereoscopic image when the signal represents the stereoscopic image, for example.

Herein, although there is a deformatting process corresponding to "3D_video_format" illustrated in FIG. 10 and a stereoscopic conversion process in a stereoscopic rendering process (process related to display multiplexing of the right-eye image signal and the left-eye image signal), for example, as the process in the second image signal processing unit 212, this is not limited to the above description.

Further, when the second image signal processing unit 212 performs the process to display the stereoscopic image, for example, this may transmit the information related to the process to the external device for allowing the user to watch the stereoscopic image such as the liquid crystal shutter glasses through the external communicating unit (not illustrated). In this manner, the image signal processing device 200A may allow the user to watch the stereoscopic image corresponding to the image signal in cooperation with the external device for allowing the user to watch the stereoscopic image such as the liquid crystal shutter glasses. Meanwhile, it goes without saying that a method of cooperating with the external device for allowing the user to watch the stereoscopic image such as the liquid crystal shutter glasses in the image signal processing device 200 according to the embodiment of the present invention is not limited to the above description.

Further, the second image signal processing unit 212 may selectively perform the process based on the image type setting information based on the process executing information.

The display unit 214 displays the image corresponding to the image signal transferred from the second image signal processing unit 212 on the display screen. Further, the display unit 214 adjusts the brightness for each part of the display screen according to the brightness control signal transferred from the brightness controller 210.

Herein, although there is the display device having the light source capable of emitting light for each area corresponding to each pixel or a plurality of pixels such as the liquid crystal display, for example, as the display unit 214, this is not limited to the above description. For example, the display unit 214 may be the self-emitting type display device without the separate light source such as the organic EL display. When the display unit 214 is configured to have the separate light source, the light emission of the light source is controlled according to the brightness control signal, and when the display unit 214 is configured to be the self-emitting type without the separate light source, the light emission of a light emitting device is controlled according to the brightness control signal, for example.

The image signal processing device 200A corresponding to the first configuration example of the image signal processing device 200 according to the embodiment of the present invention may process the received image signal and selectively perform the control of the brightness gradient and the light source control of the display device based on the received setting information with the configuration illustrated in FIG. 11, for example. Meanwhile, it goes without saying that the first configuration example of the image signal processing device 200 according to the embodiment of the present invention is not limited to the configuration illustrated in FIG. 11.

[2] Second Configuration Example (Configuration Example Corresponding to Image Signal Processing Device 200B)

Figure 13:
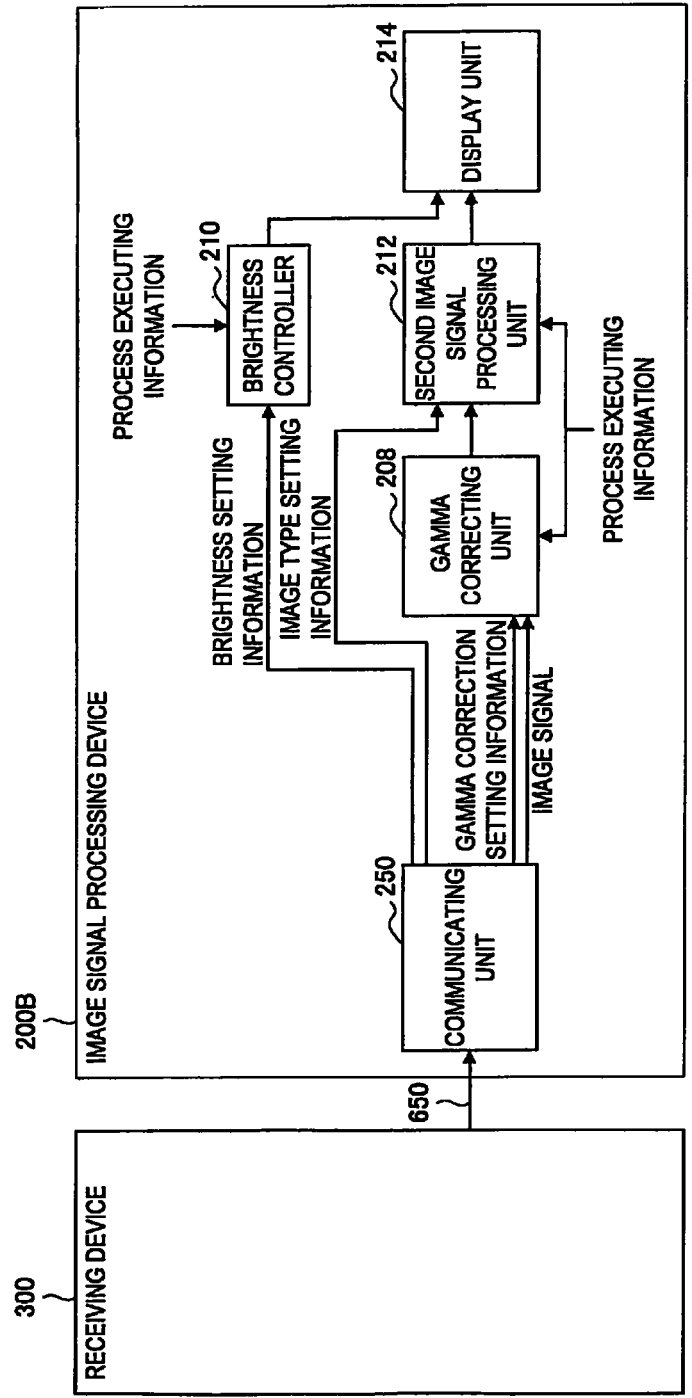
FIG. 13 is an explanatory diagram for illustrating a second example of a configuration of an image signal processing device according to the embodiment of the present invention.

FIG. 13 is an explanatory diagram illustrating a second example of the configuration of the image signal processing device 200 according to the embodiment of the present invention. Herein, FIG. 13 illustrates an example of the configuration of the image signal processing device 200B, which receives the transmission signal transmitted from the transmitting device 100 through the receiving device 300, as the configuration according to the second example of the image signal processing device 200. Further, FIG. 13 illustrates the receiving device 300 together.

With reference to FIG. 13, the image signal processing device 200B is provided with a communicating unit 250 for receiving the transmission signal transmitted from the receiving device 300, the gamma correcting unit 208, the brightness adjusting unit 210, the second image signal processing unit 212 (stereoscopic image processing unit) and the display unit 214.

Further, the image signal processing device 200B may be provided with the controller (not illustrated), the ROM (not illustrated), the RAM (not illustrated), the storage unit (not illustrated), the operating unit (not illustrated), the external communicating unit (not illustrated) and the like as the image signal processing device 200A according to the first configuration example.

The communicating unit 250 receives the transmission signal transmitted from the receiving device 300 through the connection interface 650. Then, the communicating unit 250 transfers the image signal and the setting information (image type setting information, gamma correction setting information and brightness setting information) to the corresponding components based on the received transmission signal.

More specifically, the communicating unit 250 transfers the image signal and the gamma correction setting information to the gamma correcting unit 208 and transfers the image type setting information to the second image signal processing unit 212. Further, the communicating unit 250 transfers the brightness setting information to the brightness controller 210. That is to say, the communicating unit 250 provided in the image signal processing device 200B according to the second configuration example serves to receive the transmission signal and transfer the image signal and the setting information included in the transmission signal to the corresponding components (serves as the receiving unit in the image signal processing device 200) as the receiving unit 204 provided in the image signal processing device 200A according to the second configuration example.

Herein, when the connection interface 650 is the HDMI, the receiving device 300 (communicating unit provided in the above-described receiving device 300) serves as a HDMI source and the communicating unit 250 serves as a HDMI sink.

<Configuration Example of Receiving Device 300<

Figure 14:
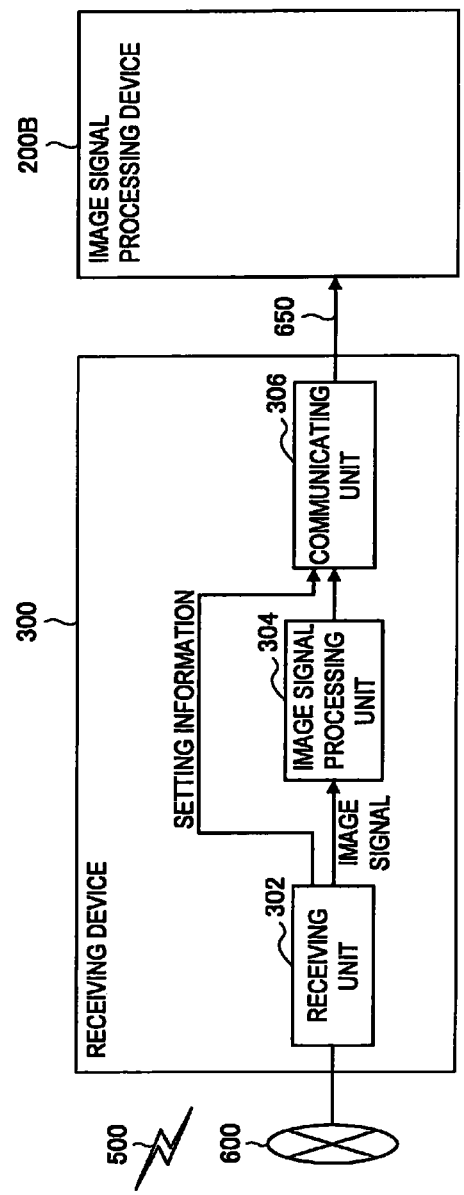
FIG. 14 is an explanatory diagram for illustrating an example of a configuration of the transmitting device according to the embodiment of the present invention.

Herein, a configuration of the receiving device 300 for transmitting the transmission signal through the connection interface 650 is described. FIG. 14 is an explanatory diagram illustrating an example of the configuration of the receiving device 300 according to the embodiment of the present invention. Herein, FIG. 14 illustrates the image signal processing device 200B together.

The receiving device 300 is provided with the receiving unit 302, the image signal processing unit 304 and the communicating unit 306.

Further, the receiving device 300 may be provided with a controller (not illustrated) composed of the MPU and the like for controlling an entire receiving device 300, the ROM (not illustrated), the RAM (not illustrated), a display unit (not illustrated) for displaying a state and the like of the receiving device 300 on the display screen.

Herein, the ROM (not illustrated) stores the control data such as the program and the arithmetic parameter used by the controller (not illustrated). The RAM (not illustrated) temporarily stores the program and the like executed by the controller (not illustrated). Although there is the liquid crystal display and the like, for example, as the display unit (not illustrated), this is not limited to the above description.

The receiving unit 302 receives the transmission signal and transfers the image signal and the setting information included in the transmission signal to the corresponding components. More specifically, the receiving unit 302 transfers the image signal to the image signal processing unit 304 and transfers the setting information to the communicating unit 306.

Herein, the receiving unit 302 may have the configuration similar to that of the receiving unit 204 provided in the image signal processing device 200A illustrated in FIG. 12, for example, this is not limited to the above description.

The image signal processing unit 304 processes the image signal transferred from the receiving unit 302 and transfers the processed image signal to the communicating unit 306.

Herein, although there is the process similar to that of the first image signal processing unit 206 provided in the image signal processing device 200A illustrated in FIG. 11, for example, as the process in the image signal processing unit 304, this is not limited to the above description.

The communicating unit 306 transmits the transmission signal corresponding to the received transmission signal to the image signal processing device 200B based on the setting information transferred from the receiving unit 302 and the image signal transferred from the image signal processing unit 304.

Figure 15:
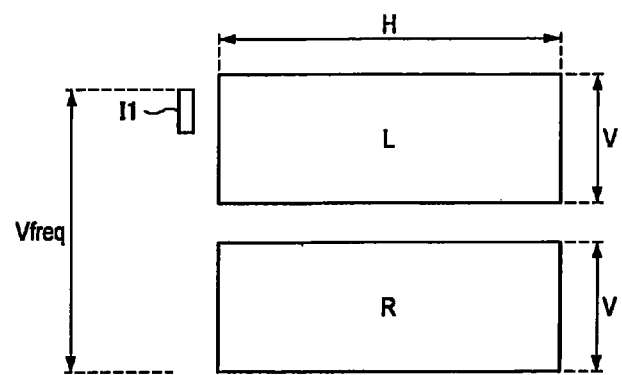
FIG. 15 is an explanatory diagram illustrating an example of a transmission signal transmitted by a receiving device according to the embodiment of the present invention.
Figure 16:
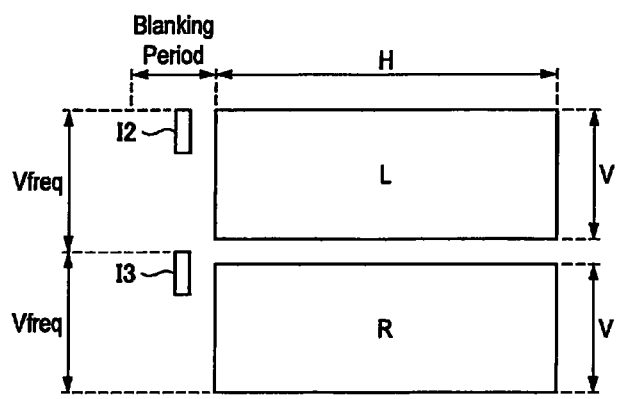
FIG. 16 is an explanatory diagram illustrating an example of a transmission signal transmitted by a receiving device according to the embodiment of the present invention.

FIGS. 15 and 16 are explanatory diagrams illustrating an example of the transmission signal transmitted by the receiving device 300 according to the embodiment of the present invention. Herein, FIG. 15 illustrates an example of a case in which the receiving unit 302 of the receiving device 300 transmits the transmission signal using the HDMI version 1.4. Further, FIG. 16 illustrates an example of a case in which the receiving unit 302 of the receiving device 300 transmits the transmission signal using the HDMI version 1.3. Further, each reference I1 to I3 in FIGS. 15 and 16 represents InfoFrame (including Vendor Specific, AVI InfoFrame and the like) capable of transmitting the setting information.

As illustrated in FIG. 15, when transmitting the transmission signal using the HDMI version 1.4, the receiving unit 302 arranges the left-eye image signal (corresponding to L in FIG. 15) and the right-eye image signal (corresponding to R in FIG. 15) in Vfreq in a frame unit. In the above-described case, the receiving unit 302 may transfer the image signal by SideBySide, Top&Bottom and Frame Sequential by extending a format definition of the HDMI.

Further, as illustrated in FIG. 16, when transmitting the transmission signal by using the HDMI version 1.3, the receiving unit 302 may transmit the left-eye image signal (corresponding to L in FIG. 15) or the right-eye image signal (corresponding to R in FIG. 15) and the setting information for each Vfreq.

Meanwhile, it goes without saying that the transmission signal transmitted and received through the connection interface 650 between the receiving device 300 and the image signal processing device 200B according to the embodiment of the present invention is not limited to the transmission signal illustrated in FIGS. 15 and 16.

The receiving device 300 may transmit the transmission signal corresponding to the received transmission signal to the image signal processing device 200B through the connection interface 650 with the configuration illustrated in FIG. 14, for example. Meanwhile, the configuration of the receiving device 300 according to the embodiment of the present invention is not limited to the configuration illustrated in FIG. 14.

The second configuration example of the image signal processing device 200 is described with reference to FIG. 13 again. The gamma correcting unit 208, the brightness adjusting unit 210, the second image signal processing unit 212 (stereoscopic image processing unit) and the display unit 214 have the functions and configurations similar to those of the gamma correcting unit 208, the brightness adjusting unit 210, the second image signal processing unit 212 (stereoscopic image processing unit) and the display unit 214 illustrated in FIG. 11, respectively. That is to say, the image signal processing device 200B may selectively perform the control of the brightness gradient based on the setting information in the gamma correcting unit 208 and may selectively perform the light source control of the display device based on the setting information in the brightness adjusting unit 210.

As illustrated in FIG. 13, the image signal processing device 200B is different from the image signal processing device 200A according to the first configuration example illustrated in FIG. 11 in that this is not provided with the receiving unit 204 and the first image signal processing unit 206 but is provided with the communicating unit 250. However, the image signal processing device 200B may selectively perform the control of the brightness gradient based on the setting information and the light source control of the display device based on the setting information as the image signal processing device 200A according to the first configuration example illustrated in FIG. 11.

Therefore, the image signal processing device 200 may process the received image signal and selectively perform the control of the brightness gradient and the light source control of the display device based on the received setting information as the image signal processing device 200A according to the first configuration example illustrated in FIG. 11.

[3] Another Configuration Example

The configuration of receiving the transmission signal transmitted from the transmitting device 100 without the receiving device 300 (first configuration example) and the configuration of receiving the transmission signal through the receiving device 300 (second configuration example) are described above as the configuration examples of the image signal processing device 200 according to the embodiment of the present invention. However, the configuration of the image signal processing device 200 according to the embodiment of the present invention is not limited to the above-described first and second configuration examples.

For example, the image signal processing device 200 according to the embodiment of the present invention may have the configuration obtained by combining the configuration according to the first configuration example illustrated in FIG. 11 and the configuration according to the second configuration example illustrated in FIG. 13. With the above-described configuration also, the image signal processing device 200 according to the embodiment of the present invention may process the received image signal and selectively perform the control of the brightness gradient and the light source control of the display device based on the received setting information as in the above-described first and second configuration examples.

As described above, the image signal processing system 1000 according to the embodiment of the present invention has the transmitting device 100, the image signal processing device 200 and the receiving device 300. The transmitting device 100 transmits the image signal and the setting information for each predetermined unit. The image signal processing device 200 processes the image signal received (through the receiving device 300/without the receiving device 300) and selectively performs the control of the brightness gradient and/or the light source control of the display device based on the received setting information. Therefore, in the image signal processing system 1000, it becomes possible to prevent the amount of light entering the eyes of the user from decreasing when the image processed by the image signal processing device 200 is displayed on the display screen of the display device.

Further, in the image signal processing system 1000, the image signal processing device 200 performs the control of the brightness gradient and/or the light source control of the display device based on the setting information transmitted by the transmitting device 100. That is to say, in the image signal processing device 200 according to the embodiment of the present invention, the control of the brightness gradient and/or the light source control of the display device is not freely performed based on the received image signal as in the case of using the method of preventing the amount of light entering the eyes of the user from decreasing. Therefore, in the image signal processing system 1000, possibility that the image displayed on the display screen and watched by the user does not sufficiently reflect the intention of the contents author side may be further reduced, so that the higher quality image may be realized.

Therefore, with the transmitting device 100 and the image signal processing device 200, the image signal processing system capable of realizing the high quality image while preventing the amount of light entering the eyes of the user from decreasing when the image signal is displayed on the display screen is realized.

Further, in the image signal processing system 1000, the transmitting device 100 selectively transmits the setting information corresponding to the type (flat image/stereoscopic image) of the image of the image signal to be transmitted and the image signal processing device 200 performs the process based on the setting information. Therefore, the user who watches the image corresponding to the image signal processed by the image signal processing device 200 may watch the image with the same brightness level when the flat image is displayed and when the stereoscopic image is displayed on the display screen.

Further, in the image signal processing system 1000, the transmitting device 100 sets the set value to be set in the setting information based on the brightness average value for each divided area as illustrated in FIG. 9, for example, and the image signal processing device 200 performs the process based on the setting information. Therefore, in the image signal processing system 1000, there is compatibility in the display level of the image displayed on the display screen when each control in the image signal processing device 200 is necessary and when the control is not necessary.

Although the transmitting device 100 is described above as the component composing the image signal processing system 1000 according to the embodiment of the present invention, the embodiment of the present invention is not limited to this. The embodiment of the present invention may be applied to various devices such as a computer such as a server and a personal computer (PC), for example.

Although the image signal processing device 200 is described as the component composing the image signal processing system 1000 according to the embodiment of the present invention, the embodiment of the present invention is not limited to this. The embodiment of the present invention may be applied to various devices such as the computer such as PC, a portable communicating device such as a cell phone and a personal handyphone system (PHS), video/audio reproducing device (or video/music recording reproducing device), a portable game machine and the television receiving set, for example.

Although the receiving device 300 is described as components composing the image signal processing system 1000 according to the embodiment of the present invention, the embodiment of the present invention is not limited to this. The embodiment of the present invention may be applied to various devices such as the set top box, the computer such as the PC and the television receiving set, for example.

(Program According to Embodiment of the Present Invention)

It is possible to generate the setting information for each predetermined unit of the image signal based on the image signal to be transmitted and transmit the image signal and the setting information by the program for causing the computer to serve as the transmitting device according to the embodiment of the present invention. Therefore, by the program for causing the computer to serve as the transmitting device according to the embodiment of the present invention, the image signal processing system capable of realizing the high quality image while preventing the amount of light entering the eyes of the user from decreasing when the image signal is displayed on the display screen may be realized.

Further, it is possible to process the received image signal and selectively perform the control of the brightness gradient and the light source control of the display device based on the received setting information by the program for causing the computer to serve as the image signal processing device according to the embodiment of the present invention. Therefore, by the program for causing the computer to serve as the image signal processing device according to the embodiment of the present invention, the image signal processing system capable of realizing the high quality image while preventing the amount of light entering the eyes of the user from decreasing when the image signal is displayed on the display screen may be realized.

Further, it is possible to transfer the transmission signal corresponding to the transmission signal transmitted from the transmitting device to the image signal processing device by the program for causing the computer to serve as the receiving device according to the embodiment of the present invention. Therefore, by the program for causing the computer to serve as the image signal processing device according to the embodiment of the present invention, the image signal processing system capable of realizing the high quality image while preventing the amount of light entering the eyes of the user from decreasing when the image signal is displayed on the display screen may be realized.

It should be understood by those skilled in the art that various modifications, combinations, sub-combinations and alterations may occur depending on design requirements and other factors insofar as they are within the scope of the appended claims or the equivalents thereof.

For example, although it is described above that the program (computer program) for causing the computer to serve as the transmitting device, the image signal processing device and the receiving device according to the embodiment of the present invention is provided, the embodiment of the present invention may further provide the storage medium in which the above-described program is stored.

The above-described configuration describes an example of the embodiment of the present invention and is naturally within the scope of the technical field of the present invention.

The invention claimed is:

1. An image signal processing device, comprising:
a receiving unit for receiving an image signal and setting information for each predetermined unit of the image signal including image type setting information to define whether the image signal represents a stereoscopic image and gamma correction setting information to define a gamma correction amount for the image signal;
a gamma correcting unit for performing gamma correction for the image signal based on the gamma correction setting information included in the setting information received by the receiving unit; and
a stereoscopic image processing unit for selectively performing a process to display the stereoscopic image for the image signal corrected by the gamma correcting unit based on the image type setting information included in the setting information received by the receiving unit,
wherein the gamma correction setting information is determined by computing a brightness average value for each of a plurality of divided areas of the image signal, determining a number of divided areas for which the brightness average value is not larger than a predetermined value, comparing the number of divided areas for which the brightness average value is not larger than a predetermined value to a threshold, and setting the gamma correction setting information according to whether or not the number of divided areas for which the brightness average value is not larger than a predetermined value is less than the threshold.

2. The image signal processing device according to claim 1, wherein
the gamma correcting unit selectively performs the gamma correction based on the gamma correction setting information based on process executing information related to execution of a process being stored.

3. The image signal processing device according to claim 1, further comprising:
a display unit for displaying an image corresponding to the image signal output from the stereoscopic image processing unit on a display screen and is capable of adjusting brightness for each part of the display screen; and
a brightness controller for transferring a brightness control signal for controlling the brightness of the each part of the display screen to the display unit, wherein
the setting information further includes brightness setting information to define the brightness of each part of the display screen, and
the brightness controller transfers the brightness control signal based on the brightness setting information included in the setting information received by the receiving unit to the display unit.

4. A transmitting device, comprising:
a setting unit for setting set values to be set in image type setting information to define whether an image signal to be transmitted represents a stereoscopic image, gamma correction setting information to define a gamma correction amount for the image signal to be transmitted and/or brightness setting information to define brightness of each part of a display screen for each predetermined unit of the image signal to be transmitted based on the image signal to be transmitted;
a transmission signal generating unit for generating a transmission signal including the image signal to be transmitted and setting information for each predetermined unit of the image signal to be transmitted including the image type setting information, the gamma correction setting information and/or the brightness setting information based on the image signal to be transmitted and the set values for each predetermined unit of the image signal to be transmitted set by the setting unit; and
a transmitting unit for transmitting the transmission signal generated by the transmission signal generating unit,
wherein the gamma correction setting information is determined by computing a brightness average value for each of a plurality of divided areas of the image signal, determining a number of divided areas for which the brightness average value is not larger than a predetermined value, comparing the number of divided areas for which the brightness average value is not larger than a predetermined value to a threshold, and setting the gamma correction setting information according to whether or not the number of divided areas for which the brightness average value is not larger than a predetermined value is less than the threshold.

5. The transmitting device according to claim 4, wherein
the setting unit judges whether the image signal to be transmitted represents the stereoscopic image, and
when it is judged that the image signal to be transmitted represents the stereoscopic image, sets the set values based on a brightness average value based on the image signal to be transmitted for each divided area obtained by dividing an area corresponding to a display screen.

6. The transmitting device according to claim 5, wherein the setting unit derives degree distribution of brightness average values for each divided area and sets the set values based on the derived degree distribution and one or two or more predetermined threshold.

7. An image signal processing method, comprising the steps of:
receiving an image signal and setting information for each predetermined unit in the image signal including image type setting information to define whether the image signal represents a stereoscopic image and gamma correction setting information to define a gamma correction amount for the image signal;
performing gamma correction for the image signal based on the gamma correction setting information included in the setting information received in the step of receiving; and
selectively performing a process to display the stereoscopic image for the image signal corrected in the step of performing the gamma correction based on the image type setting information included in the setting information received in the step of receiving,
wherein the gamma correction setting information is determined by computing a brightness average value for each of a plurality of divided areas of the image signal, determining a number of divided areas for which the brightness average value is not larger than a predetermined value, comparing the number of divided areas for which the brightness average value is not larger than a predetermined value to a threshold, and setting the gamma correction setting information according to whether or not the number of divided areas for which the brightness average value is not larger than a predetermined value is less than the threshold.

8. A non-transitory computer-readable medium having stored thereon a computer-readable program for causing a computer to execute the steps of:
receiving an image signal and setting information for each predetermined unit of the image signal including image type setting information to define whether the image signal represents a stereoscopic image and gamma correction setting information to define a gamma correction amount for the image signal;
performing gamma correction for the image signal based on the gamma correction setting information included in the setting information received in the step of receiving; and
selectively performing a process to display the stereoscopic image for the image signal corrected in the step of performing the gamma correction based on the image type setting information included in the setting information received in the step of receiving,
wherein the gamma correction setting information is determined by computing a brightness average value for each of a plurality of divided areas of the image signal, determining a number of divided areas for which the brightness average value is not larger than a predetermined value, comparing the number of divided areas for which the brightness average value is not larger than a predetermined value to a threshold, and setting the gamma correction setting information according to whether or not the number of divided areas for which the brightness average value is not larger than a predetermined value is less than the threshold.

9. An image signal processing system, comprising:
a transmitting device including
a setting unit for setting set values to be set in image type setting information to define whether an image signal to be transmitted represents a stereoscopic image and gamma correction setting information to define a gamma correction amount for the image signal to be transmitted for each predetermined unit of the image signal to be transmitted based on the image signal to be transmitted,
a transmission signal generating unit for generating a transmission signal including the image signal to be transmitted and setting information for each predetermined unit of the image signal to be transmitted including the image type setting information and the gamma correction setting information based on the image signal to be transmitted and the set values for each predetermined unit of the image signal to be transmitted set by the setting unit, and
a transmitting unit for transmitting the transmission signal generated by the transmission signal generating unit; and
an image signal processing device including
a receiving unit for receiving the transmission signal,
a gamma correcting unit for performing gamma correction for the image signal included in the transmission signal received by the receiving unit based on the gamma correction setting information included in the setting information included in the transmission signal received by the receiving unit, and
a stereoscopic image processing unit for selectively performing a process to display the stereoscopic image for the image signal corrected by the gamma correcting unit based on the image type setting information included in the setting information included in the transmission signal received by the receiving unit,
wherein the gamma correction setting information is determined by computing a brightness average value for each of a plurality of divided areas of the image signal, determining a number of divided areas for which the brightness average value is not larger than a predetermined value, comparing the number of divided areas for which the brightness average value is not larger than a predetermined value to a threshold, and setting the gamma correction setting information according to whether or not the number of divided areas for which the brightness average value is not larger than a predetermined value is less than the threshold.

* * * * *